April 14, 1970     A. C. BRADER ET AL     3,505,736
MECHANICAL ARCH FORM WITH PLURALITY OF INTEGRAL
ARCH FORM ATTACHMENTS
Filed July 11, 1967     3 Sheets-Sheet 1

Allen C. Brader
Raymond C. Thurow
INVENTORS

BY *Clarence A. O'Brien*
*and Harvey B. Jacobson*
Attorneys

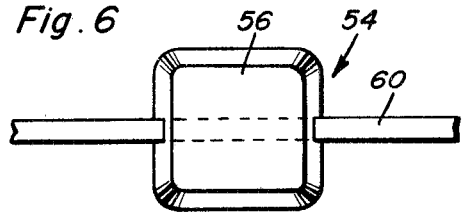
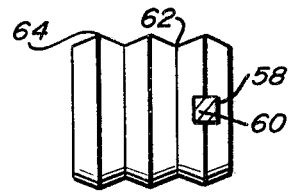
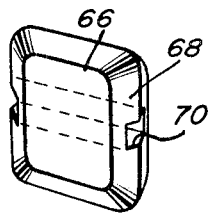
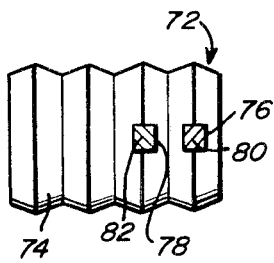
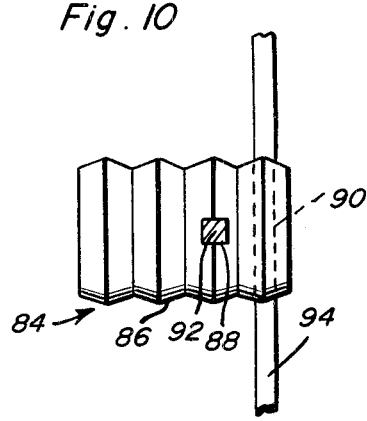
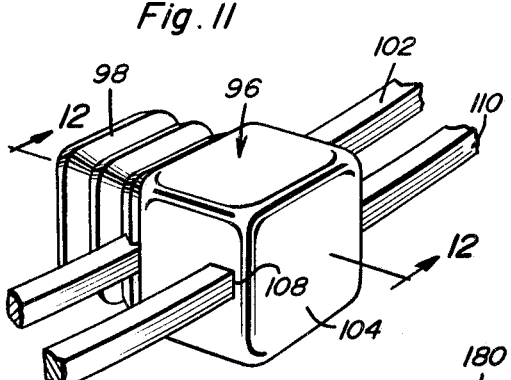
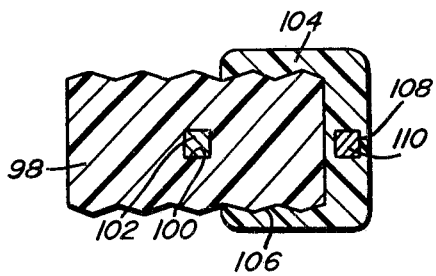
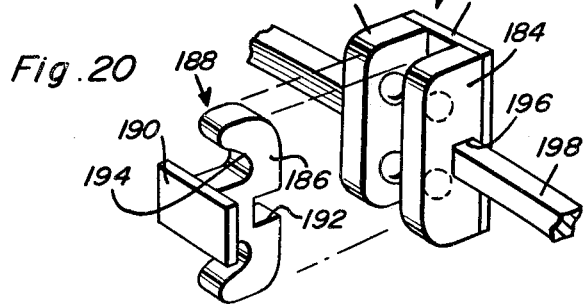
Allen C. Brader
Raymond C. Thurow
INVENTORS

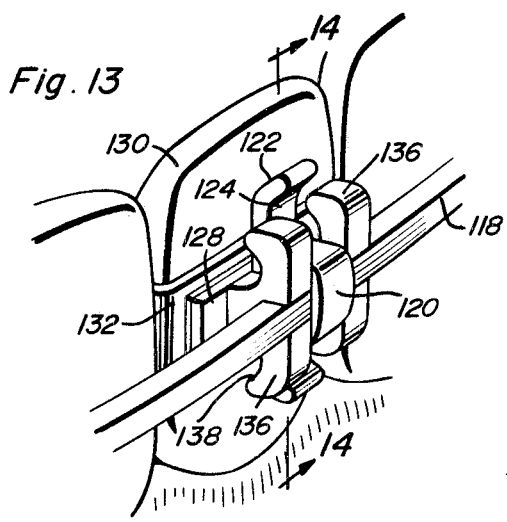
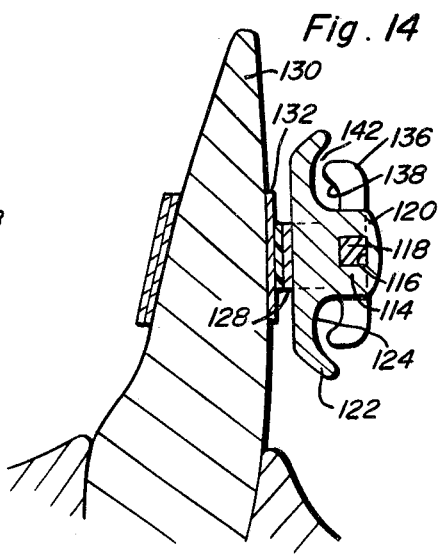
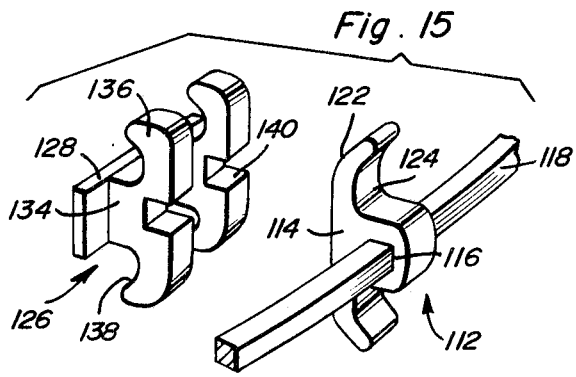
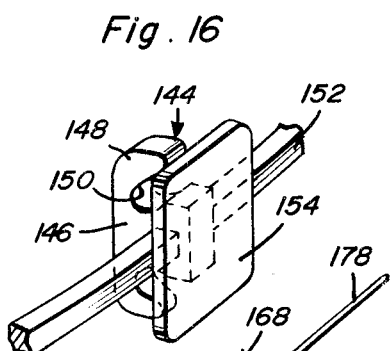
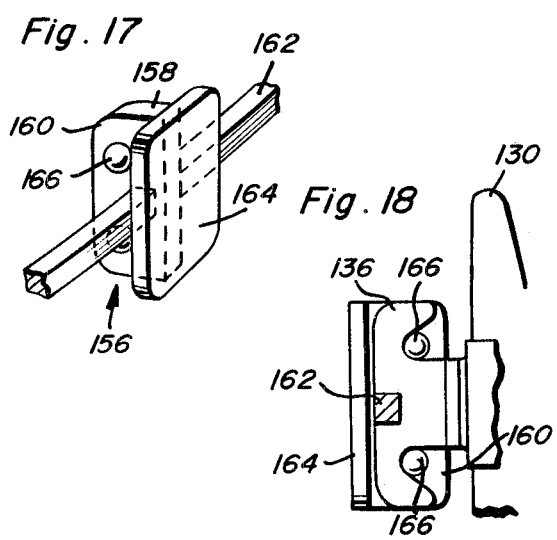
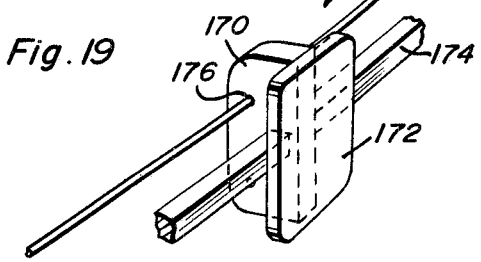
Allen C. Brader
Raymond C. Thurow
INVENTORS United States Patent Office 3,505,736
Patented Apr. 14, 1970

3,505,736
MECHANICAL ARCH FORM WITH PLURALITY OF
INTEGRAL ARCH FORM ATTACHMENTS
Allen C. Brader, 1350 Hamilton St., Allentown, Pa.
18102, and Raymond C. Thurow, 8 W. Mifflin St.,
Madison, Wis. 53703
Filed July 11, 1967, Ser. No. 652,444
Int. Cl. A61c 7/00
U.S. Cl. 32—14                                    11 Claims

ABSTRACT OF THE DISCLOSURE

A mechanical arch form to facilitate and control application of force to a tooth or teeth in the practice of orthodontic methods. The arch form is provided with a plurality of integral attachments for cooperation with a fixed tooth attachment for the application of forces in all three planes of space plus torsion to accomplish optimum positioning of each tooth. The attachments may be cooperatively retained with a fixed tooth attachment (dental attachment) in various manners and the arch form attachments may be rigidly fixed to the arch form or may be slidably attached to the arch form, rotatively or non-rotatively in either instance.

The present invention generally relates to orthodontic methods and procedures and more particularly to an arch form on which is mounted a plurality of integral arch form attachments which are cooperatively associated with dental attachments or brackets that anchor to the teeth or a tooth in various manners.

In practicing orthodontic methods and procedures, it is well-known that movement of teeth to improved positions requires the application of force for an extended period of time to each tooth to be moved. To accomplish optimum positioning of each tooth requires control of such application of force and control of such movement in all three planes of space. For applying such force to a tooth, there is normally provided a fixed tooth attachment generally called a dental attachment or a dental bracket which is fixed to a tooth in various manners. To provide the force, most procedures for tooth movement apply forces stored elastically in deformed wire, rubber or other resilient material acting directly against and through the dental attachment and then to the tooth. Such forces are stored elastically in a wire or other material which is generally referred to as an arch or arch form. Conventionally, the arch form is connected to the dental attachments by tying with fine ligature wire or by pins or other separated devices. Accordingly, it is an object of the present invention to provide an arch form having a plurality of integral arch form attachments thereon to facilitate the controlled application of force acting from the arch form (which may be an arch wire) to the dental attachment through the medium of a cooperating association between the integral arch form attachment and the dental attachment without the need for separate ligature wires or pins or other devices.

Another object of the present invention is to provide an arch form with a plurality of integral arch form attachments so constructed that when mated with a dental attachment, a force applied by the arch form or arch wire so as to tip, turn or otherwise move the tooth will be transferred to the tooth undiminished through the medium of the dental attachment. Many variations in shape, size and configuration of the arch form and integral arch form attachments are provided to cooperatively mate with various dental attachments. Larger integral arch form attachments permit the use of smaller more flexible wire arch forms providing a precision mating fit with standardized dental attachments.

A further object of the present invention is to provide an arch form with a plurality of integral arch form attachments which are cooperatively associated with dental attachments in various ways such as by employing a snapping action, a tongue and groove type sliding action, a contained movable part or the like thus eliminating the need for ligature wires or other supplementary attachment devices.

Still another object of the present invention is to provied an arch form with integral arch form attachments in which the attachments may be molded directly onto an arch wire to accomplish integral construction, and may be slidingly attached to the arch wire, either rotatively or non-rotatively, or fixedly attached to the arch wire by deforming the wire where the integrally molded attachment engages the wire, or fixedly attached to the wire by soldering, brazing, welding, adhesive material or any other connecting arrangement.

Yet another important object of the present invention is to provide an arch form with a plurality of integral arch form attachments in which a single arch wire or multiple arch wires may be provided for attachment to each tooth to be controlled so that the arch wires can be deformed and so adjusted between the dental attachments to provide the necessary force to accomplish all necessary alterations or changes in the relationship between the teeth.

Still another important feature of the present invention is the provision of an arch form with a plurality of integral arch form attachments which eliminates the requirement of a precision fit between the arch wire cross-section and the dental attachment inasmuch as the integral arch form attachments permit an unlimited choice of arch wire sizes and therefore a broader selection of elastic properties and resulting forces. A slidingly attached integral arch form attachment permits adjustment of distance between controlled teeth without alterations in the arch wire. A slidingly attached integral arch form attachment also permits gathering of the arch wire between dental attachments for special deformations such as opening loops, closing loops, torquing loops, hooks, and the like. A fixedly attached integral arch form attachment permits control of distances between teeth by means of deformation of the intervening arch wire and the application of resultant forces to the teeth through the medium of the dental attachment and also permits the application of tipping forces to the teeth by the deformation of the wire in torsion. This function is impossible with round arch wires except by the bending of loops in such wires to engage the tooth at a point some distance from the axis of the wire. The formation of such loops in the arch wire frequently adds undesirable changes in the elastic behavior of the wire in other planes of space. These loops also initiate soft tissue irritation in adjacent areas. The only other present means for accomplishing the application of torquing forces to the teeth is by the use of square or rectangular arch wires which engage cooperating slots in the dental attachment (generally referred to as edgewise bracket attachments) and such arch wires are too rigid for optimum force application in many situations. A wire of rectangular cross-section loses capacity for torque applications as its size diminishes toward dimensions which for reasons of size and strength of materials leave it nearly round. At dimensions at which torque is feasible, the over-all wire cross-section is so large that it exerts stresses in excess of the threshold of dental pain and tissue damage unless adjustments are carried out in a long series of very small increments.

In addition to the foregoing objects and advantages, the arch form with a plurality of integral arch form attachments of the present invention facilitates the installation of the arch form and cooperative association with the dental attachments thereby reducing the time necessary to properly apply forces to the teeth insofar as the installation is concerned and by more efficient and controlled application of forces to the teeth, the repositioning and movement of the teeth will be accomplished in a more expeditious manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 6 is a plan view of another embodiment of integral arch form attachment;

FIGURE 7 is a side elevational view of the integral arch form attachment of FIGURE 6;

FIGURE 8 is a perspective view of another embodiment of integral arch form attachment;

FIGURE 9 is a side elevational view of another form of integral arch form attachment in which two parallel arch forms or arch wires are connected;

FIGURE 10 is a side elevational view of another embodiment of the integral arch form attachment in which a pair of arch forms or arch wires are connected with the arch forms or arch wires being in perpendicular relation to each other;

FIGURE 11 is a perspective view of another embodiment of integral arch form attachments illustrating the manner in which two integral arch form attachments may be interconnected;

FIGURE 12 is a sectional view taken substantially upon a plane passing along section line 12—12 of FIGURE 11 Illustrating the specific structural details of this embodiment of the invention;

FIGURE 13 is a perspective view illustrating another embodiment of the integral arch form attachment and Illustrating its association with a wing-type dental attachment;

FIGURE 14 is a vertical sectional view taken substantially upon a plane passing along section line 14—14 of FIGURE 13 illustrating the structure details of this embodiment of the invention;

FIGURE 15 is an exploded perspective view illustrating the association of the integral arch form attachment, the arch form or arch wire and the wings of the dental attachment;

FIGURE 16 is a perspective view of another embodiment of an integral arch form attachment similar to that in FIGURES 13–15 but which is provided with a facing plate to cover the integral arch form attachment and also the wing type dental attachment;

FIGURE 17 is a perspective view of another embodiment of the integral arch form attachment with extensions of material to permit a cooperative snap fit with the dental attachment;

FIGURE 18 is a side elevational view of the integral arch form attachment illustrated in FIGURE 17 snapped into engagement with a wing type dental attachment;

FIGURE 19 is a perspective view of another embodiment of integral arch form attachment having apertures therein receiving a self-containing (integrally molded) ligature wire for attachment to the wing type dental attachment; and FIGURE 20 is an exploded perspective view of a paired arch form attachment associated with a single winged dental tie bracket.

Figure 1:
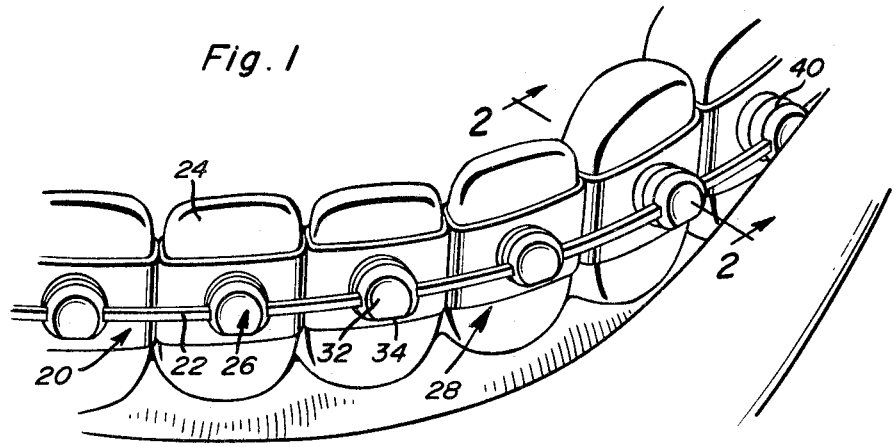
FIGURE 1 is a partial perspective view of the arch form with a plurality of integral arch form attachments thereon connected to a plurality of teeth through engagement with dental attachments.
Figure 2:
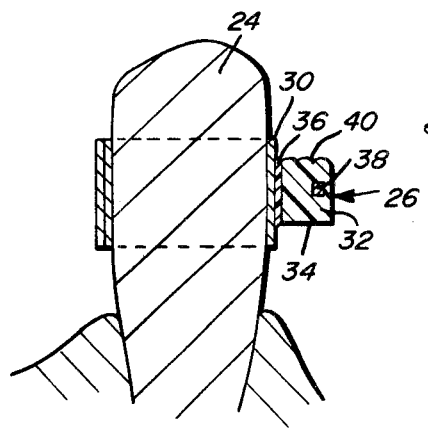
FIGURE 2 is a sectional view taken substantially upon a plane passing along section line 2—2 of FIGURE 1 illustrating the relationship of the integral arch form attachment with the dental attachment.
Figure 3:
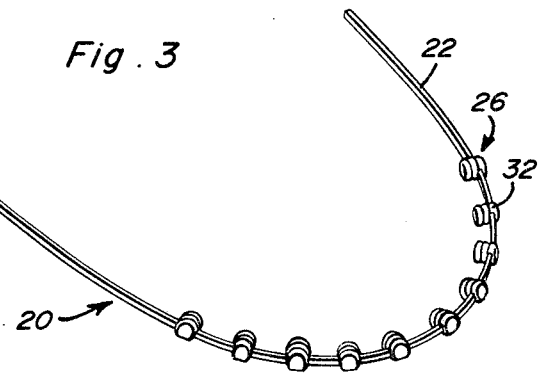
FIGURE 3 is a perspective view of the arch form illustrating the plurality of integral arch form attachments thereon.

The arch form with integral arch form attachments illustrated in FIGS. 1–3 of the drawings is designated by numeral 20 and includes an elongated resilient and elastic member in the form of an arch wire 22 which may be constructed of metallic wire, rubber or other elastic material which is deformed or positioned in such a manner to apply forces in all three planes and torsion to selected teeth 24 depending upon the requirements necessary to apply forces to a tooth or teeth 24 to properly orientate the teeth in position. The force exerted by the arch wire 22 is transferred through a plurality of integral arch form attachments 26 directly to a dental attachment or a dental bracket generally designated by numeral 28 and then directly to a tooth or teeth 24 without diminishment of the force. The dental attachment 28 is in the form of a band 30 encircling the tooth 24 in a conventional manner and is secured thereto in a completely conventional manner and other manners of attaching the dental attachment to the tooth may also be employed. Each of the integral arch form attachments 26 are connected to the dental attachment 28 in various manners. As illustrated in FIGS. 1–3, the integral arch form attachment 26 is in the form of a generally cylindrical body of plastic material 32 having a flattened lower surface 34 serving as an orienting key. A cooperating dental attachment is employed to secure the integral arch form attachment 26 with the band 30. The details of the cooperating dental attachment are not illustrated inasmuch as it does not form part of this invention. As disclosed adhesive 36 bonds the attachment 26 to band 30. The body 32 is provided with a bore 38 therethrough which receives the arch wire 22 and both the arch wire and bore may be of rectangular or square construction or may be of any other shape and configuration. The peripheral surface of the body 32 other than the flattened lower surface 34 thereof is provided with a plurality of grooves 40 which are longitudinally spaced on the periphery of the body 32. The plurality of grooves 40 define shaped undercut areas which engage corresponding multiple sockets in the cooperating dental attachment as shown in copending application Ser. No. 669,598 to permit snap-fit assembly and anchorage and subsequent disassembly.

Figure 4:
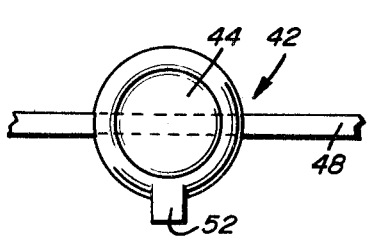
FIGURE 4 is a fragmental plan view of another embodiment of the integral arch form attachment.
Figure 5:
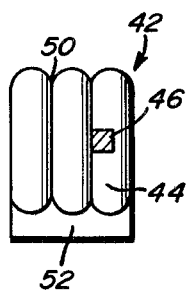
FIGURE 5 is a side elevational view of the construction of FIGURE 4.

FIGS. 4 and 5 illustrate another embodiment of integral arch form attachment 42 including a generally cylindrical plastic body 44 having a passageway 46 therethrough for receiving an arch wire; square arch wire 48 being illustrated although round or other forms may be used. The body 44 is provided with a plurality of peripheral grooves 50 and generally planar inner and outer surfaces. Projecting laterally from one side edge of the body 44 is a longitudinally extending lug or flange 52 which forms a key for the arch form attachment. The embodiment illustrated in FIGS. 1–3 includes the flat surface 34 which forms a key whereas the flange 52 in the embodiment illustrated in FIGS. 4 and 5 provides an extending key.

FIGS. 6 and 7 illustrate another embodiment of the integral arch form attachment 54 having a generally square body 56 with a passageway 58 extending therethrough for receiving a square arch wire 60. In this embodiment of the invention, the body 56 is also provided with a plurality of grooves 62 and high spots or ridges 64 and the ends of the body are preferably planar and flat.

FIG. 8 illustrates a body 66 similar to the structure illustrated in FIGS. 6 and 7 but of less length in which the peripheral edge of the body is provided with opposite bevels 68 which corresponds with one segment of the body illustrated in FIGS. 6 and 7. FIG. 8 also illustrates the configuration of a passageway 70 which is square to conform with the cross-sectional configuration of a square arch wire which extends therethrough in which the body is either slidable on the arc wire or fixed thereto. Any cross-sectional shape of wire may be used although the square is the preferred embodiment.

FIG. 9 illustrates another embodiment of the integral arch form attachment 72 in the form of a relatively elongated body 74 having alternate ridges and grooves in which a pair of passageways 76 and 78 are provided for receiving a pair of arch wires 80 and 82 in which the arch wires 80 and 82 are parallel and adjacent to each other.

FIG. 10 illustrates another embodiment of the invention 84 in which the body 86 has a pair of passageways 88 and 90 extending therethrough for receiving a pair of arch wires 92 and 94. As illustrated, the passageways 88 and 90 as well as the arch wires 92 and 94 are disposed in perpendicular relation to each other and are disposed adjacent one end of the body. In each of the embodiments of FIGS. 1–10, the arch wire or wires are disposed adjacent one end of the body and the other end of the body is connected to the dental attachment.

FIGS. 11 and 12 disclose a multiple arch form attachment generally designated by numeral 96 which includes a body 98 which may be similar to the body 56 illustrated in FIGS. 6 and 7 with a passageway 100 extending therethrough receiving an arch wire 102 generally in the center thereof. A second body 104 having a socket 106 therein conforming with the exterior configuration of the body 98 is attached to one end of the body 98 and is also provided with a passageway 108 therethrough receiving a wire 110. It will be appreciated that the wires 102 and 110 may be orientated in parallel relation to each other as illustrated in FIGURES 11 and 12 or oriented in perpendicular relation to each other.

The arch form with integral arch form attachments illustrated in FIGS. 13–15 is generally designated by numeral 112 and includes a plastic body 114 having a passageway 116 therethrough receiving an arch wire 118 in which the passage 116 and arch wire 118 are square. The body 114 is generally T-shaped and includes a central shank 120 in which the passage 116 is formed and lateral extensions or wings 122 having recesses or notches 124 therein. The arch form with integral arch form attachments 112 is adapted to be received in a conventional dental attachment, generally designated by the numeral 126.

The dental attachment 126 includes a base plate 128 anchored to a tooth 130 in any suitable manner such as being attached to an anchor band 132 which encircles the tooth 130 in a conventional manner. Attached to the base plate 128 is a pair of spaced bodies or projections 134 which have laterally extending wings 136 thereon each of which has an undercut notch or recess 138 in the inner surface theerof and the wings 136 are separated from each other by notches 140 communicating with the outer edge of each of the projections or bodies 134 and the notches 140 receive the arch wire 118 and may be of the same configuration as the arch wire or larger. The bodies or brackets 134 are preferably constructed of metal as are the wings and this type of bracket is known as an orthodontic tie bracket or attachment and the arch wire 118 is normally attached to the wings 136 by a ligature wire. In this construction, the integral arch form attachment 112 is closely received between the brackets 134 with the recesses 124 in the wings 122 being spaced from and extending above and below the recesses 138 in the brackets 134 to form passageways 142 as illustrated in FIG. 14, to enable a ligature wire or the like to be inserted upwardly or downwardly through a passageway 142 and over the arch wire 118 to secure the integral arch form attachment 112 to the dental attachment 126. The wings 122 serve as a guide to help slide the ligature wire under recesses 138. The ligature wire passes under the bracket wings 126 and over the attachment wings 122 and over the arch wire 118.

FIGURE 16 illustrates another embodiment of the integral arch form attachment generally designated by the numeral 144 and which is substantially the same as that illustarted in FIG. 15 but includes a body 146 having wings 148 thereon with recesses 150. The body 146 has a passage receiving the arch wire 152 and attached to the flattened outer end of the shank of the body 146 which is substantially T-shaped, is a top facing plate 154 which overlies the metal brackets of the dental attachment 126 and forms a top facing and conceals the metal. This construction also simplifies the positioning of the ligature wire in that the top facing or plate 154 is engaged with the outer surface of the brackets 134 on the dental attachment 126 when assembled therewith. The facing 154 may be contoured to more intimately conform to the surface of the brackets 134.

FIGURE 17 illustrates another embodiment of the arch form with the integral arch form attachment associated therewith generally designated by numeral 156 which includes a generally T-shaped body 158 having a shank 160 provided with a passage through which the arch wire 162 extends. A top facing or plate 164 is attached to the shank 160 or may be integral therewith with the shank 160 adapted to extend between the brackets 134 on the dental attachment 126. On each side of the shank 160, there is provided a pair of raised detents 166 which are preferably hemispherical in configuration and when assembled with the wings 136 of the brackets 134, the detents will snap into the recesses 138 as illustrated in FIGURE 18 thereby providing a snapping engagement or snap-fit under the bracket wings thereby eliminating the necessity of using ligature wires for securing the integral arch form attachment 156 to the dental attachment 126.

FIGURE 19 illustrates another embodiment of the integral arch form attachment generally designated by numeral 168 and similar in construction to that illustrated in FIGS. 17 and 18 in that it is provided with a body having a shank 170 and a facing 172 with the shank 170 having a passage receiving the arch wire 174. The shank 170 of the body is provided with a pair of passages 176 therethrough for receiving an integral ligature wire 178. The ligature wire 178 is fixedly attached to the shank of the body 170 and will pass under the bracket wings 130 of the dental attachment 126 then to the opposite side of the arch form attachment 168 to tie under the bracket wings on the dental attachment 126 on the opposite sides to secure the whole unit with the contained arch form or arch wire to the dental attachment 126. In lieu of the ligature wire, the structure illustrated in FIG. 19 may include an integrally molded wire spring or clip for retention under the bracket wings 136 to facilitate installation of the arch form attachment and the arch form integral therewith to the dental attachment 126 without requiring the tying of a ligature wire.

FIGURE 20 illustrates another embodiment of the integral arch form attachment 180 which includes a plate 182 having a pair of legs or shanks 184 which straddle and closely receive the single wing 186 of a single winged dental tie bracket 188 which also includes an attaching plate 190 and a notch 192 and recesses 194 similar to bracket 126 in FIGURES 13–15. The legs 184 also have passageways 196 receiving the arch wire 198 and inwardly facing detents 200 similar to the detents 166 in FIGURES 17 and 18 to engage the wing 186 to mount the attachment 180 on the bracket 188. This same type of attachment may also be used with a ligature wire in which event the legs 184 are shaped like the shank 146 in FIGURE 16.

The dental attachment 126 is in the form of a tie bracket which receives an arch wire in the recesses formed in the wings thereof with the arch wire being secured in the notches or recesses by employing a ligature wire extending under the wings and tied in a conventional manner. The arch form may be an arch wire or may be constructed of any other suitable material such as materials other than wire. Each arch form construction incorporates integral arch form attachments and includes a unit structure arrangement comprised of molded attachments joined together which are the same molding material and so constructed to permit prefabricated elastically deformable structures. The embodiments of the integral arch form attachments having the top facing thereon serve to conceal the metallic wing brackets on the dental attachment or dental bracket to enhance the appearance characteristics of the dental attachment and the wing brackets associated therewith.

It is pointed out that many variations of the arch form attachment may be employed and the cooperative association with the dental attachment may also be varied with either conventional dental attachments being employed or special dental attachments being employed. The force to be exerted on the tooth by the arch form is transmitted to the tooth in undiminished form. Various means of cooperatively connecting the integral arch form attachment with the dental attachment may be employed with the cooperative association being variable but in all instances capable of transmitting the desired forces in all three planes and in torsion without altering the characteristics of the forces exerted by the arch form or arch wire. These materials from which the integral arch form attachments are constructed may vary and may include metal, plastics or the like and where plastics, porcelain or the like are employed, such materials will enhance the appearance of the orthodontic appliance.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. A mechanical orthodontic arch form comprising a deformable resilient member of elongated configuration capable of being deformed and thus storing energy to apply a force when endeavoring to return to its normal position, and a plurality of arch form attachments integrally attached to said elongated member and adapted to be connected with the teeth for applying forces to the teeth, each arch form attachment including a body having a plurality of passages therein for receiving a corresponding number of elongated members, said body being of two-piece construction with one of the passages being in one piece and the other of the passages being in the other piece, said two pieces being orientable with the passages parallel and in angular relation to each other for orienting the elongated members parallel and in angular relation to each other.

2. The structure as defined in claim 1 wherein the two-piece body includes telescopic male and female components having coacting ridges and grooves for snap-fitting assembly.

3. A mechanical orthodontic arch form comprising a deformable resilient member of elongated configuration capable of being deformed and thus storing energy to apply a force when endeavoring to return to its normal position, and a plurality of arch form attachments mounted on and supported solely from said elongated member, said arch form attachments adapted to be connected with dental attachments on the teeth for applying forces to the teeth, each arch form attachment including a body having a passage therethrough closely enclosing a portion of said elongated member, said arch form attachment being in the form of a generally T-shaped body having a shank adapted to extend between the winged brackets on a tie bracket, said shank having pairs of oppositely disposed detents projecting from the surfaces thereof for snapping engagement under the wings of the winged brackets on a winged dental tie bracket.

4. The structure as defined in claim 3 wherein the outer end of said shank is provided with a face plate covering the shank and adjacent winged brackets on the winged dental tie bracket.

5. A mechanical orthodontic arch form comprising a deformable resilient member of elongated configuration capable of being deformed and thus storing energy to apply a force when endeavoring to return to its normal position, and a plurality of arch form attachments mounted on and supported solely from said elongated member, said arch form attachments adapted to be connected with dental attachments on the teeth for applying forces to the teeth, each arch form attachment including a body having a passage therethrough closely enclosing a portion of said elongated member, said body being in the form of a substantially T-shaped member with the outer end portion of the shank having the passage therein receiving the elongated member, the inner end of the shank having laterally extending wings thereon for engaging a ligature wire when associated with a paired tie bracket attached to a tooth, the outer end of the body being provided with a facing plate overlying and concealing the winged bracket on the winged dental tie bracket.

6. A mechanical orthodontic arch form comprising a deformable resilient member of elongated configuration capable of being deformed and thus storing energy to apply a force when endeavoring to return to its normal position, and a plurality of arch form attachments mounted on and supported solely from said elongated member, said arch form attachments adapted to be connected with dental attachments on the teeth for applying forces to the teeth, each arch form attachment including a body having a passage therethrough closely enclosing a portion of said elongated member, said body being in the form of a substantially T-shaped member with the outer end portion of the shank having the passage therein receiving the elongated member, the inner end of the shank having laterally extending wings thereon for engaging a ligature wire when associated with a paired tie bracket attached to a tooth, the inner end of the body being constructed to fit against a base plate between the bracket thus augmenting the engagement between the arch form attachment and the dental attachment for more efficient transmission of force therebetween.

7. The structure as defined in claim 6 wherein the outer end of said shank is provided with a face plate covering the shank and adjacent winged brackets on the winged dental tie.

8. A mechanical orthodontic arch form comprising a deformable resilient member of elongated configuration capable of being deformed and thus storing energy to apply a force when endeavoring to return to its normal position, and a plurality of arch form attachments mounted on and supported solely from said elongated member, said arch form attachments adapted to be connected with dental attachments on the teeth for applying forces to the teeth, each arch form attachment including a body having a passage therethrough closely enclosing portion of said elongated member, said body being in the form of a substantially U-shaped member straddling a single wing of a winged dental tie bracket, the inner ends of the legs of said U-shaped member having laterally extending wings thereon for engaging a ligature wire when associated with a single winged dental tie bracket attached to a tooth.

9. A mechanical orthodontic arch form comprising a deformable resilient member of elongated configuration capable of being deformable and thus storing energy to apply a force when endeavoring to return to its normal position, and a plurality of arch form attachments mounted on and supported solely from said elongated member, said arch form attachments adapted to be connected with dental attachments on the teeth for applying forces to the teeth, each arch form attachment including a body having a passage therethrough closely enclosing a portion of said elongated member, said body being in the form of a substantially U-shaped member for straddling the single wing of a single winged dental tie bracket, each leg of said U-shaped member having at least one detent on the inner surface thereof for snapping engagement under the opposite edges of a single wing on a single winged dental tie bracket.

10. A mechanical orthodontic arch form comprising a deformable resilient member of elongated configuration capable of being deformed and thus storing energy to apply a force when endeavoring to return to its normal position, and a plurality of arch form attachments mounted on and supported solely from said elongated member, said arch form attachments adapted to be connected with dental attachments on the teeth for applying forces to the teeth, each arch form attachment including a body having a passage therethrough closely enclosing a portion of said elongated member, said arch form attachment being in the form of a substantially T-shaped member with the outer end portion of the shank having the passage therein receiving the elongated member, the inner end of the shank adapted to extend between the winged brackets on a winged dental tie bracket, and face plate on the outer end of the shank covering the shank and adjcent winged brackets on the winged dental tie bracket.

11. The structure as defined in claim 10 together with ligature wire receiving passages in said shank for receiving ligature wires to engage with the winged brackets on a winged dental tie bracket.

References Cited

UNITED STATES PATENTS

| | | | |
|---|---|---|---|
| 1,240,731 | 9/1917 | Kinehan | 32—14 |
| 1,398,761 | 11/1921 | Angle et al. | 32—14 |
| 2,019,773 | 11/1935 | Wirt | 32—14 |
| 2,686,365 | 8/1954 | Schurter | 32—14 |
| 3,091,857 | 6/1963 | Rubin et al. | 32—14 |
| 3,218,713 | 11/1965 | Wallshein | 32—14 |
| 3,218,714 | 11/1965 | Wallshein | 32—14 |

ROBERT PESHOCK, Primary Examiner